Nov. 22, 1966  M. J. C. RINGWOOD ET AL  3,286,652
STORAGE EQUIPMENT
Filed Sept. 23, 1964  2 Sheets-Sheet 1
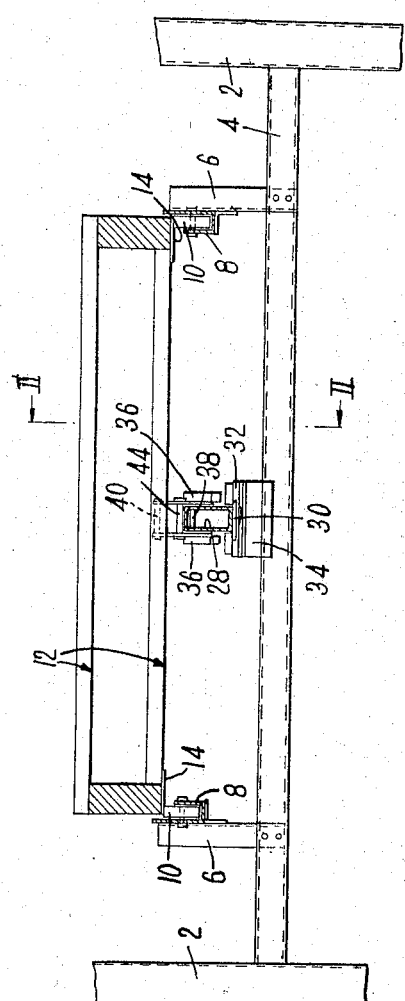
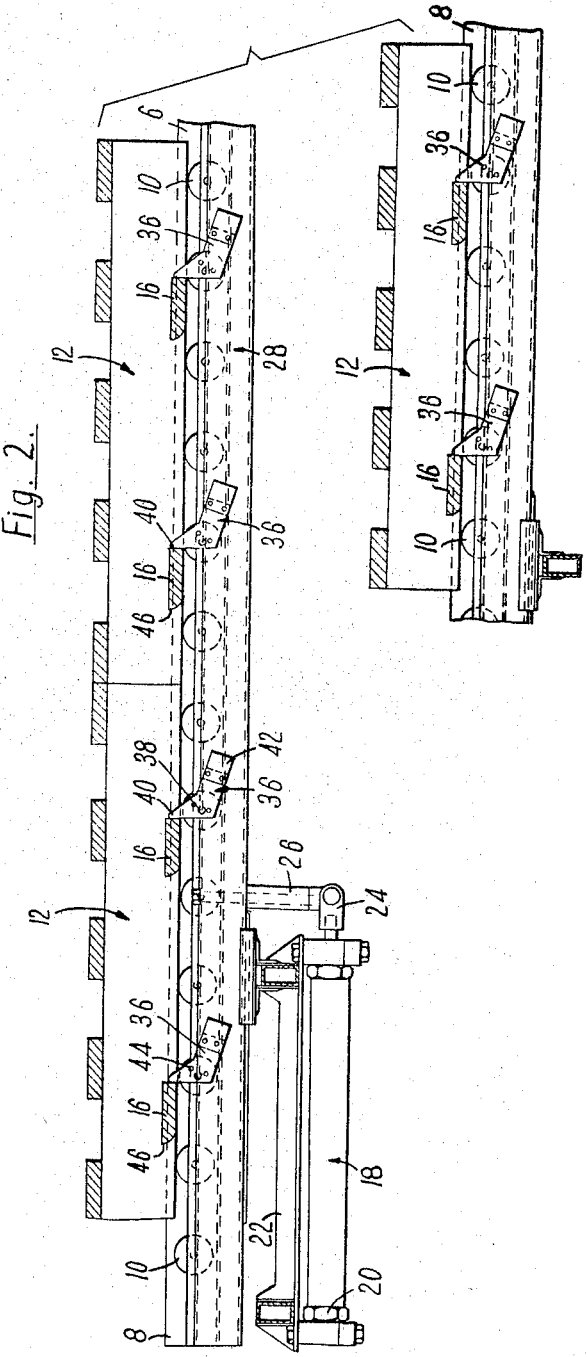
Inventors –
Michael Charles Ringwood
Wesley John Spooner
By
Dowell N Dowell
Attorneys Nov. 22, 1966   M. J. C. RINGWOOD ETAL   3,286,652
STORAGE EQUIPMENT
Filed Sept. 23, 1964   2 Sheets-Sheet 2
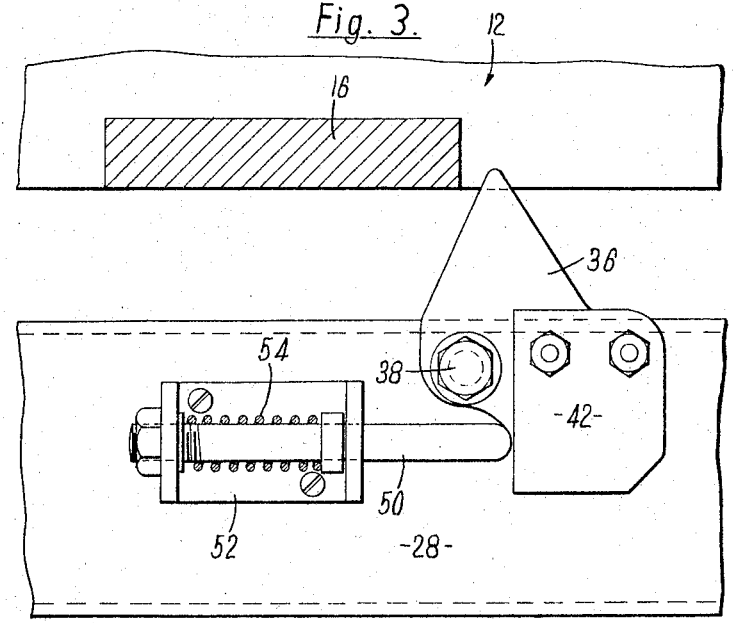
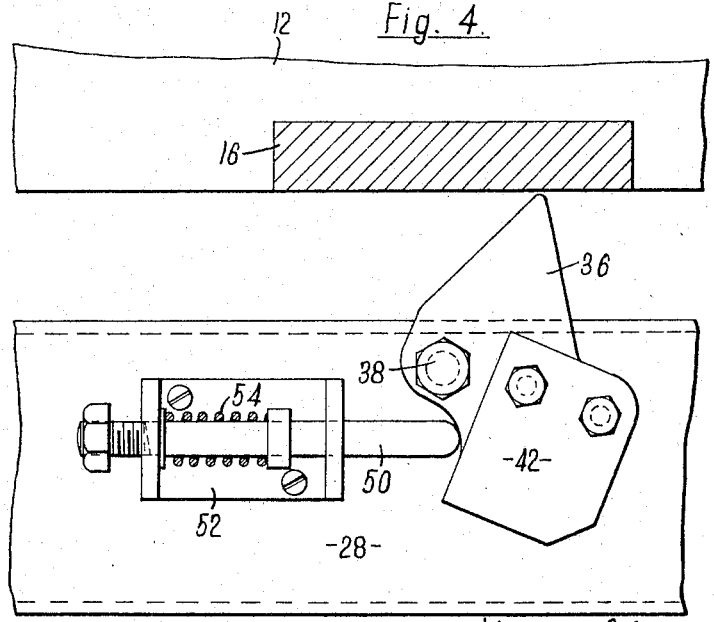

United States Patent Office 3,286,652
Patented Nov. 22, 1966

3,286,652
STORAGE EQUIPMENT
Michael John Charles Ringwood, Eastcote, and Wesley John Spooner, Chalfont St. Peter, England, assignors to Acrow (Engineers) Limited, Paddington, London, England
Filed Sept. 23, 1964, Ser. No. 398,620
2 Claims. (Cl. 104—147)

This invention relates to storage equipment. It is particularly concerned with equipment for storage systems of the type in which the loads to be stored are carried on pallets or the like which are designed to run on tracks supported by racking or the like, each track comprising a lane which extends from one side of the storage racking to the other, the pallets and hence the loads, being stored in the lanes. Each lane holds a number of pallets one behind the other and the pallets are moved through the lane from the loading end of the racking through the storage area, constituted by the length of the lanes, to the unloading end. For each lane the pallets will reach the unloading end in the same order as they were loaded into the lanes.

The number of lanes that are available in any particular installation is governed by the size of the pallet being used and the storage area that is available for the installation. The racking can be arranged so that one lane is provided above another lane as well as side by side and the number of tiers of lanes is governed by the manner in which the pallets are unloaded at the end of the lanes, (also, of course, the manner in which the pallets are loaded) and by the height that is available in the storage area together with the height of the pallet load.

In storage equipment of this type means has to be provided to move the pallets and their loads on the tracks through the lanes and this invention is essentially concerned with this movement.

In storage equipment of the type described in accordance with the invention the pallets are arranged to be moved along the lanes step by step through the use of a reciprocating drive means. The reciprocal motion is preferably arranged to drive the pallets through "cams" or "fingers" which on a "forward" stroke are arranged to engage a pallet to move it forward and which on a "return" stroke are arranged to move back without moving the pallet to be then positioned for the next forward or driving stroke. This is conveniently achieved by pivotally mounting a number of trip fingers on a common carrier which is reciprocated by the reciprocating drive means. Each finger is arranged to engage a portion of one pallet, or of more than one pallet, on each forward or driving stroke and on the return stroke to move back until it engages the leading end of a fixed driving bar or the like on the pallet, whereupon the finger pivots so that its driving face passes beneath the driving bar on the pallet. Each finger is biased so as to pivot to a position in which the driving face is ready to engage the trailing surface of the driving bars at the end of its stroke ready for the next forward or driving movement.

An example of storage equipment in accordance with the invention will now be described with reference to the accompanying drawings, in which:

FIGURE 1 is an end view of one lane of the equipment;

FIGURE 2 is a section on the line II—II of FIGURE 1 partly broken away.

FIGURE 3 is a diagram of an alternative form of trip finger in the position immediately prior to a drive stroke; and FIGURE 4 is a diagram corresponding to FIGURE 3 but showing the trip finger in the safety position.

The storage equipment comprises racking including uprights 2 connected by horizontal members 4. Each horizontal member has upstanding from it two short pillars 6 carrying U-shaped tracks 8 the distance between the tracks constituting one "lane" of the equipment. It will be appreciated that a number of lanes can extend one above the other between each pair of uprights 2 and that a complete installation can include a number of pairs of uprights side by side and hence a number of tiers of lanes.

Each track 8 has a number of wheels 10 pivotally secured within it and on which pallets 12 run. The outer arm of the U-shaped tracks is made slightly longer than the inner, as can be seen in FIGURE 1, so as to provide a guide for the outer ends of the pallets. Each pallet is provided with runners 14 which engages the top of the wheels 10 and also with a number of driving bars 16 which in some construction of pallet can be constituted by members forming a structural part of the pallets.

The loaded pallets which are run into the tracks one after another, at one end of each lane are moved through the lane for unloading at the other end, by a drive mechanism comprising a hydraulically operated linear actuator, generally indicated at 18, which is carried by the racking by a clamp 20 and mounting 22. The outer end of the piston of the actuator is provided with a clevis 24 engaging the lower end of a tenon rod 26, the upper end of which is secured to a cam carrier 28. Thus, as the actuator piston reciprocates the cam carrier also reciprocates along the track. The carrier which extends along the major part of the lane, is provided with slide plates 30 which rest on carrier slides 32 which are secured through mountings 34 to the horizontal member 4, as can be seen in FIGURE 1.

The carrier has a number of pairs of cam or "finger" members 36 pivotally mounted on it, one member of each pair at each side. The fingers are mounted about a pivot pin 38 and have a driving tongue portion 40 at one side of the pivot and a tail portion 42 at the other side which carries a counter-weight. The cams are shown in FIGURE 2 in the driving position where their further rotation in the clockwise direction is prevented by means of the engagement of a stop pin 44 with the upper face of the carrier 28 as can be seen in FIGURE 1. In this position the driving face 40 of the fingers is engaged with the trailing edge of the driving bars 16 of the pallets. As can be seen from the drawing the distance between each pair of fingers on the carrier is equal to the distance between the driving bars 16 on each pallet so that each finger is in driving engagement with a pallet. Furthermore the distance between the rearward driving bar of a relatively forward pallet and the forward driving bar of a relatively rearward pallet is also equal to or less than the distance between two fingers on the carrier so that two pallets can be driven together and so that each pallet is picked up in turn and moved forward by the drive means.

On a forward or driving stroke of the piston of the hydraulic actuator 18 the carrier and hence the pallets are moved forward through one stroke. In the return stroke of the piston the carrier and hence each finger moves back until the relative rear face of the driving portion of each finger which face is sloping, engages the curved loading edge 46 of the driving bars 16, whereupon the fingers pivot about their axes 38 in an anti-clockwise direction as seen in the drawings and against the bias provided by the counterweight, so that the curved edge of the driving tongue passes beneath the driving bars until the fingers are clear of the bars, whereupon the fingers pivot in a clockwise direction, due to their counter-weights, to reassume the position shown in the drawings, engaging, or about to engage, the rear driving faces of the driving bars of the pallets ready for the next forward stroke.

The storage pallets are thus moved through a lane in a series of steps one for each reciprocation of the piston of the hydraulic actuator.

The reciprocal movement can be produced by the use of compressed air or alternatively by the use of any suitable mechanical equipment designed to provide reciprocation. The fingers can be spring loaded to the driving position instead of incorporating a counter-weight or they can be activated by direct connection to the reciprocating movement or by a separate source of power. In these latter two cases the fingers would be connected together through rods or levers.

It will be appreciated that when pallets are being loaded at the loading end of a lane, they need not be specifically connected to the drive means or positioned accurately. This is because the use of the fingers will enable the pallets to be picked up and moved forward irrespective of their original longitudinal position.

The pallets can be of a standard type such as is shown in the drawings, or can be of a cantilever type if the height of the storage equipment is limited. The wheels 10 can, of course, be made of any suitable substance e.g. nylon, Bakelite, synthetic rubber, artificial plastic with or without ball bearing; ball bearings will, however, normally have to be provided if very heavy loads are to be carried.

Each storage lane of the equipment has its own linear actuator and the actuators of several lanes may be driven by a common hydraulic pump. Control of the linear actuator movement can be achieved through a solenoid operated valve and a maintained contact micro-switch which is mounted on the carrier or it can be manually operated or can be produced by the use of another linear actuator operating a valve. The actual movement of the pallets along the storage lanes can be controlled by any standard manual, semi-automatic or automatic control equipment including punched tape controllers or computers.

It will be appreciated, however, that the actual control of the pallet movement is dependent upon the requirements of a particular installation, the main factors that are involved being:

(a) The method of loading and unloading pallets on to and from the storage lanes.

(b) The time taken to carry out these operations, and (c) The number of pallets that are stored in a lane at any one time.

It will be appreciated that by the use of a hydraulic actuating system, these factors can be allowed for very easily as a hydraulic system is inherently very flexible and hence a single set of equipment can enable complete control of quite different installation requirements to be obtained and the simplicity of the system is such that there is very little which can go wrong and hence maintenance problems are minimised.

For some types of systems loads may not be mounted on separate pallets but the pallets or their equivalent may form part of the loads.

In the construction shown in FIGURES 3 and 4 each cam finger 36 is held in the driving position by a spring loaded plunger 50 which is mounted in a bracket 52 secured to the member 28. The strength of the spring 54 is made such that the fingers 36 remain in the drive position to move the pallets during all normal circumstances. If however the lanes are blocked the plungers can move into the position shown in FIGURE 4 overcoming the pressure of the spring 54 so that no damage to the pallets or the hydraulic drive system occurs and the fingers pivot in a clockwise direction and move under the drive bars 16.

What is claimed is:

1. Pallet storage equipment comprising a track for pallets, which track is open ended and extends from one side of the equipment to the other, a reciprocating drive means incorporating fingers provided to move the pallets in the track, the fingers on a forward drive stroke engaging a pallet to move it in the track and on a return stroke pivoting to a position in which they do not move the pallets; said fingers being pivotally mounted on a common carrier which is reciprocated by said reciprocating drive means, and said fingers being biased to drive positions in which they engage pallets on a drive stroke and are pivoted against the force of the bias on a return stroke due to the engagement of the fingers with the pallets, and said fingers being held in their driving positions by biasing members which can move on a drive stroke to allow the fingers to pivot to non-drive positions upon obstruction of the pallet track.

2. Pallet storage equipment as claimed in claim 1 in which the biasing member for the fingers comprises a spring loaded plunger.

References Cited by the Examiner

UNITED STATES PATENTS

| 446,106 | 2/1891 | Wegmann et al. | 104—124 |
| 797,610 | 8/1905 | Schaefer | 104—172 |
| 2,583,968 | 1/1952 | Rosseau. | |
| 2,947,407 | 8/1960 | Wood. | |
| 2,949,863 | 8/1960 | Cozzoli | 104—135 |
| 2,961,973 | 11/1960 | Bozman | 104—162 |
| 2,987,010 | 6/1961 | Choma | 104—162 |
| 3,010,409 | 11/1961 | Good et al. | 104—135 |

EUGENE G. BOTZ, *Primary Examiner.*

ARTHUR L. LA POINT, *Examiner.*

F. W. MONAGHAN, D. F. WORTH,
*Assistant Examiners.*